US008490879B2

(12) United States Patent
Heim

(10) Patent No.: US 8,490,879 B2
(45) Date of Patent: Jul. 23, 2013

(54) SECURITY ELEMENT

(75) Inventor: Manfred Heim, Bad Tolz (DE)

(73) Assignee: Giesecke & Devrient GmbH, Munich (DE)

( * ) Notice: Subject to any disclaimer, the term of this patent is extended or adjusted under 35 U.S.C. 154(b) by 122 days.

(21) Appl. No.: 13/002,861

(22) PCT Filed: Jul. 8, 2009

(86) PCT No.: PCT/EP2009/004923
§ 371 (c)(1), (2), (4) Date: Jan. 6, 2011

(87) PCT Pub. No.: WO2010/003646
PCT Pub. Date: Jan. 14, 2010

(65) Prior Publication Data

US 2011/0114733 A1 May 19, 2011

(30) Foreign Application Priority Data

Jul. 9, 2008 (DE) ........................ 10 2008 032 224

(51) Int. Cl.
*G06K 19/06* (2006.01)

(52) U.S. Cl.
USPC .......................................... 235/491; 235/488

(58) Field of Classification Search
USPC ................ 235/491, 492, 486, 375, 380, 382, 235/441
See application file for complete search history.

(56) References Cited

U.S. PATENT DOCUMENTS

| | | | | |
|---|---|---|---|---|
| 5,354,099 | A | 10/1994 | Kaule et al. | |
| 6,933,686 | B1 * | 8/2005 | Bishel | 315/293 |
| 7,303,622 | B2 | 12/2007 | Loch et al. | |
| 7,667,894 | B2 | 2/2010 | Hoffmuller | |
| 7,728,931 | B2 | 6/2010 | Hoffmuller | |
| 7,808,605 | B2 | 10/2010 | Hoffmuller | |
| 7,986,459 | B2 | 7/2011 | Kaule | |
| 8,083,894 | B2 | 12/2011 | Gruszczynski | |
| 8,149,511 | B2 | 4/2012 | Kaule | |
| 2003/0120323 | A1 * | 6/2003 | Meadows et al. | 607/46 |

(Continued)

FOREIGN PATENT DOCUMENTS

| | | | |
|---|---|---|---|
| DE | 102004049118 | A1 | 4/2006 |
| DE | 102006021429 | A1 | 11/2007 |

(Continued)

OTHER PUBLICATIONS

J.A. Dobrowolski et al., "Research on thin film anticounterfeiting coatings at the National Research Council of Canada," Applied Optics 28(14):2702-2717, Jul. 15, 1989.

(Continued)

*Primary Examiner* — Thien M Le
(74) *Attorney, Agent, or Firm* — Lathrop & Gage LLP

(57) ABSTRACT

The present invention relates to a security element for securing data carriers, having a three-layer thin-film element (20) composed of a reflection layer (22), an absorber layer (26) and a dielectric spacing layer arranged between the reflection layer and the absorber layer (24). According to the present invention, the reflection layer (22), the absorber layer (26) and the dielectric spacing layer (24) are coordinated with each other in such a way that, for viewing from the absorber layer side (26) at all viewing angles (28, 28') and in the entire visible spectral range, the thin-film element exhibits a very low reflection and appears black.

24 Claims, 6 Drawing Sheets

U.S. PATENT DOCUMENTS

Figure 1:
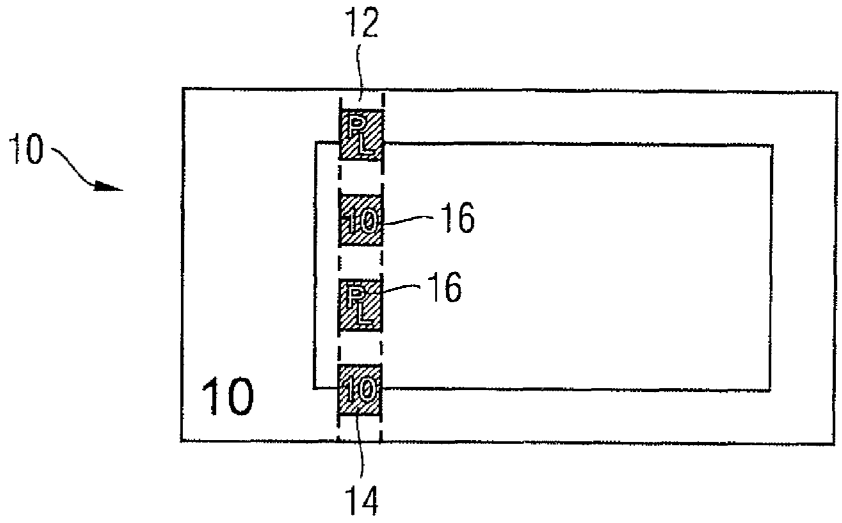

| | | | | |
|---|---|---|---|---|
| 2003/0143400 | A1* | 7/2003 | Phillips et al. | 428/404 |
| 2007/0128528 | A1* | 6/2007 | Hess et al. | 430/5 |
| 2007/0165182 | A1 | 7/2007 | Hoffmuller | |
| 2007/0211238 | A1 | 9/2007 | Hoffmuller | |
| 2007/0216518 | A1 | 9/2007 | Hoffmuller | |
| 2007/0229928 | A1 | 10/2007 | Hoffmuller | |
| 2007/0241553 | A1 | 10/2007 | Heim | |
| 2007/0246933 | A1 | 10/2007 | Heim | |
| 2007/0274559 | A1 | 11/2007 | Depta | |
| 2008/0014378 | A1 | 1/2008 | Hoffmuller | |
| 2008/0054621 | A1 | 3/2008 | Burchard | |
| 2008/0079257 | A1 | 4/2008 | Fessl | |
| 2008/0088859 | A1 | 4/2008 | Depta | |
| 2008/0160226 | A1 | 7/2008 | Kaule | |
| 2008/0163994 | A1 | 7/2008 | Hoppe | |
| 2008/0198468 | A1 | 8/2008 | Kaule | |
| 2008/0216976 | A1 | 9/2008 | Ruck | |
| 2008/0233401 | A1* | 9/2008 | Raksha et al. | 428/404 |
| 2008/0250954 | A1 | 10/2008 | Depta | |
| 2008/0258456 | A1 | 10/2008 | Rahm | |
| 2009/0001709 | A1 | 1/2009 | Kretschmar | |
| 2009/0008923 | A1 | 1/2009 | Kaule | |
| 2009/0008926 | A1 | 1/2009 | Depta | |
| 2009/0102605 | A1 | 4/2009 | Kaule | |
| 2009/0115185 | A1 | 5/2009 | Hoffmuller | |
| 2009/0236061 | A1 | 9/2009 | Gruszczynski | |
| 2009/0297805 | A1 | 12/2009 | Dichtl | |
| 2009/0322071 | A1 | 12/2009 | Dichtl | |
| 2010/0175843 | A1 | 7/2010 | Gregarek | |
| 2010/0177094 | A1 | 7/2010 | Kaule | |
| 2010/0182221 | A1 | 7/2010 | Kaule | |
| 2010/0194091 | A1 | 8/2010 | Heim | |
| 2010/0194532 | A1 | 8/2010 | Kaule | |
| 2010/0196587 | A1 | 8/2010 | Keller | |
| 2010/0207376 | A1 | 8/2010 | Heim | |
| 2010/0208036 | A1 | 8/2010 | Kaule | |
| 2010/0307705 | A1 | 12/2010 | Rahm | |
| 2010/0308570 | A1 | 12/2010 | Heim | |
| 2010/0320742 | A1 | 12/2010 | Hoffmuller | |
| 2011/0007374 | A1 | 1/2011 | Heim | |
| 2011/0012337 | A1 | 1/2011 | Heim | |
| 2011/0027538 | A1 | 2/2011 | Hoffmann | |
| 2011/0045248 | A1 | 2/2011 | Hoffmuller | |
| 2011/0069360 | A1 | 3/2011 | Dichtl | |
| 2011/0079997 | A1 | 4/2011 | Heim | |
| 2011/0091665 | A1 | 4/2011 | Heim | |
| 2011/0095518 | A1 | 4/2011 | Hoffmuller | |
| 2011/0101670 | A1 | 5/2011 | Heim | |
| 2011/0109078 | A1 | 5/2011 | Hoffmuller | |
| 2011/0114733 | A1 | 5/2011 | Heim | |
| 2011/0157183 | A1 | 6/2011 | Kaule | |
| 2012/0126525 | A1 | 5/2012 | Dorfler | |
| 2012/0168515 | A1 | 7/2012 | Schutzmann | |
| 2012/0170124 | A1 | 7/2012 | Fuhse | |

FOREIGN PATENT DOCUMENTS

| | | | |
|---|---|---|---|
| EP | 0395410 | A2 | 10/1990 |
| EP | 0516790 | B1 | 10/1996 |
| EP | 0472371 | B1 | 10/1998 |
| EP | 1467873 | B1 | 10/2006 |
| EP | 1719636 | A1 | 11/2006 |
| WO | WO 99/13157 | A1 | 3/1999 |
| WO | WO 01/03945 | A1 | 1/2001 |
| WO | WO 02/31058 | A1 | 4/2002 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |
| WO | WO 2008/000350 | | 1/2008 |
| WO | WO 2008/000351 | | 1/2008 |
| WO | WO 2008/049533 | | 5/2008 |
| WO | WO 2008/061636 | | 5/2008 |
| WO | WO 2008/071325 | | 6/2008 |
| WO | WO 2009/000527 | | 12/2008 |
| WO | WO 2009/000528 | | 12/2008 |
| WO | WO 2009/000529 | | 12/2008 |
| WO | WO 2009/000530 | | 12/2008 |
| WO | WO 2009/012893 | | 1/2009 |
| WO | WO 2009/024265 | | 2/2009 |
| WO | WO 2009/080262 | | 7/2009 |
| WO | WO 2009/080263 | | 7/2009 |
| WO | WO 2009/083146 | | 7/2009 |
| WO | WO 2009/083151 | | 7/2009 |
| WO | WO 2009/100831 | | 8/2009 |
| WO | WO 2009/100869 | | 8/2009 |
| WO | WO 2009/109291 | | 9/2009 |
| WO | WO 2009/121578 | | 10/2009 |
| WO | WO 2009/149831 | | 12/2009 |
| WO | WO 2009/149833 | | 12/2009 |
| WO | WO 2009/156079 | | 12/2009 |
| WO | WO 2010/000470 | | 1/2010 |
| WO | WO 2010/003646 | | 1/2010 |
| WO | WO 2010/028739 | | 3/2010 |
| WO | WO 2011/012281 | | 2/2011 |
| WO | WO 2011/032665 | | 3/2011 |
| WO | WO 2011/032671 | | 3/2011 |

OTHER PUBLICATIONS

J.A. Dobrowolski et al., "Optical interference coatings for inhibiting of counterfeiting," Optica Acta 20(12):925-937, 1973.
International Search Report, International Application No. PCT/EP2009/004923, 3 pages, Oct. 6, 2009.
International Preliminary Report on Patentability, International Application No. PCT/EP2009/004923, 7 pages, Jan. 18, 2011, English Translation.

* cited by examiner

SECURITY ELEMENT

CROSS-REFERENCE TO RELATED APPLICATIONS

This application is the U.S. National Stage of International Application No. PCT/EP2009/004923, filed Jul. 8, 2009, which claims the benefit of German Patent Application DE 10 2008 032 224.5, filed Jul. 9, 2008; both of which are hereby incorporated by reference to the extent not inconsistent with the disclosure herewith.

The present invention relates to a security element for securing data carriers, a method for manufacturing such a security element, an appropriately equipped data carrier, and a method for manufacturing the same.

For protection, data carriers, such as value or identification documents, but also other valuable articles, such as branded articles, are often provided with security features that permit the authenticity of the data carrier to be verified, and that simultaneously serve as protection against unauthorized reproduction.

Security elements that cannot be reproduced even with the most modern copiers play a special role in safeguarding authenticity. For this purpose, special printing inks that include gloss pigments or other optical effect pigments are often printed, since the characteristic gloss and the play of colors of such pigments cannot be copied.

In addition to the security segment, gloss or effect pigments are also used in other technology segments, such as in auto paints, decorative coatings or in cosmetic formulations. Here, black gloss pigments often evolve a particular appeal, since the contrast of black ink and gloss effect, on the one hand, has a visually attractive effect, and the dark appearance, on the other hand, can provide a suitable background for a number of optical effects, such as the color-shift effects of interference layer systems or liquid crystal layers.

Based on that, it is the object of the present invention to create a security element of the kind cited above having an attractive visual appearance and high counterfeit security. This object is solved by the security element having the features of the main claim. A method for manufacturing such a security element, a data carrier equipped with such a security element, and a method for manufacturing the same are specified in the coordinated claims. Developments of the present invention are the subject of the dependent claims.

According to the present invention, a security element of the kind cited above exhibits a three-layer thin-film element composed of a reflection layer, an absorber layer and a dielectric spacing layer arranged between the reflection layer and the absorber layer, in which the reflection layer, the absorber layer and the dielectric spacing layer are coordinated with each other in such a way that the thin-film element exhibits, for viewing from the absorber layer side at all viewing angles and in the entire visible spectral range, a very low reflection and appears black.

The reflection of the thin-film element for viewing from the absorber layer side at all viewing angles and in the entire visible spectral range is preferably below 20%, preferably below 15%, particularly preferably below 10%. Advantageously, the thin-film element exhibits no reflection maximum for viewing from the absorber layer side in the entire visible spectral range and at all viewing angles.

In some embodiments, the thin-film element exhibits, for viewing from the absorber layer side, a reflection maximum in the ultraviolet spectral range, which can be used as a characteristic authenticating mark and detected with suitable spectroscopic instruments. Here, the exact position of the reflection maximum in the ultraviolet spectral range depends on the viewing angle, such that also the variation of the reflection maximum in the ultraviolet can be used as an authenticity feature.

The layer thickness of the dielectric spacing layer is preferably between about 20 nm and about 90 nm. In an advantageous variant, the spacing layer is formed substantially from a low-index dielectric having a refractive index $n<1.8$, especially composed of $SiO_2$ or $MgF_2$, and exhibits a layer thickness between 50 nm and 90 nm, especially of about 70 nm. In an alternative, likewise advantageous variant, the spacing layer is formed substantially from a high-index dielectric having a refractive index $n \geqq 1.8$, especially composed of $TiO_2$ or ZnS, and exhibits a layer thickness between 20 nm and 50 nm, especially of about 40 nm.

Due to the coordination of the thickness and the materials of the reflection layer, the absorber layer and the dielectric spacing layer in the entire visible spectral range and for all viewing angles, the thin-film element according to the present invention exhibits a very low reflection and thus appears black for the viewer. Of course, by consciously changing the thicknesses of the absorber layer, dielectric spacing layer and reflection layer, especially by changing the thickness of the dielectric spacing layer, there can also be obtained regionally a thin-film element that does not appear black for the viewer at all viewing angles and/or not in the entire visible spectral range. For example, by varying the layer thickness of the dielectric spacing layer, a thin-film element can be obtained that, in a first region, through the inventive coordination of the reflection layer, absorber layer and dielectric spacing layer, exhibits a very low reflection and appears black for the viewer in the entire visible spectral range, whereas in a second region of the thin-film element, the thickness of the dielectric spacing layer is chosen such that this second region of the thin-film element appears for the viewer, in reflected light, not black, like the first region, but rather blue. When the second region is tilted, the viewer then perceives, for example, a color change from blue (top view) to black (oblique viewing angle). In other words, the first region of the thin-film element appears black for the viewer in the entire visible spectral range and at all viewing angles, while the second region does not appear black for the viewer, at least at one viewing angle and/or in a portion of the visible spectral range.

Furthermore, with a sufficiently thick dielectric layer, it is possible to produce a thin-film element having a reflection maximum in the infrared, just beyond the visible spectral range. Since, in this case, there are always also sufficiently intense reflection maxima in the visible spectrum, the thin-film element appears for the viewer in a color that differs from black. If, however, the thin-film element is provided with a suitable, filtering color, especially a foil that, for example, absorbs blue light and transmits red light, then, in reflected light, the thin-film element appears black for the viewer. When this thin-film element having a filtering color is tilted, the reflection maximum is shifted out of the infrared into the visible spectral range (red), such that the tilted thin-film element appears red for the viewer. Accordingly, such a thin-film element having a filtering color displays for the viewer a color-shift effect from black (top view) to red (oblique viewing angle). It is understood that, through a suitable choice of the materials and thicknesses of the reflection layer, absorber layer and dielectric spacing layer, also a thin-film element can be specified that displays a color-shift effect from, for example, red (top view) or blue (top view) to black (oblique viewing angle), also additional filtering colors being able, as described above, to be combined with the respective thin-film element.

In advantageous developments of the present invention, the dielectric material of the spacing layer can be supplemented with an absorbent substance, for example with absorbent metal ions. The dielectric spacing layer can be vapor deposited or imprinted. In the latter case, carbon black, for example, can be added as an absorbent material.

If special embodiments of the present invention are to be produced that, besides the regions that appear black for the viewer at all viewing angles in the entire visible spectral range, also exhibit colored regions, the dielectric spacing layers having a changed thickness (see above) that are required for the colored and/or non-colored regions can advantageously be imprinted. It is, of course, in principle, also conceivable to obtain the regions of the thin-film element that appear black for the viewer by vapor depositing the layers of the thin-film element, and merely to develop the regions that do not appear black for the viewer as a colored motif that is arranged in a surrounding that appears black for the viewer at all viewing angles and in the entire visible spectral range.

Here, let it be mentioned that the security element according to the present invention for securing data carriers can be formed not only by an areal, three-layer thin-film element composed of a reflection layer, absorber layer and dielectric spacing layer arranged therebetween, but rather also by an areal application of thin-film pigments having the three-layer structure according to the present invention. Depending on the size of the individual thin-film pigments (thin-film flakes), for a viewer, the visual color impression of a security element having thin-film pigments is sometimes hardly distinguishable from the visual impression of a security element having an areal, three-layer thin-film element. Currently, however, thin-film pigments that appear black for the viewer at all viewing angles in the entire visible spectral range, and the security elements formed therefrom, are not preferred.

When viewed from the reflection layer side, the thin-film element according to the present invention preferably appears to be highly metallically glossy at all viewing angles and in the entire visible spectral range. This metallic reflection can especially be used in security elements that are also visible from the bottom. On the one hand, it facilitates the visual distinction of the thin-film element from conventional black printing layers, and on the other hand, it can also function as part of a further authenticity feature, as explained below based on a polarization feature in which the metallic reflection layer coacts with a phase-shifting layer.

In a development of the present invention, the thin-film element exhibits gaps in the form of patterns, characters or codes that form transparent or translucent regions in the thin-film element. The gaps can extend through the entire thin-film element, or also be developed only in the reflection layer.

According to a particularly advantageous development of the present invention, the security element exhibits a color-shifting layer composed of a cholesteric liquid crystal material that faces the absorber layer side of the thin-film element, such that the black-appearing thin-film element forms a dark background for the color-shifting layer. The color-shifting layer can, of course, also be combined with the cited gaps in the thin-film element. If the security element exhibits a carrier foil, then the thin-film element and the color-shifting layer can be arranged on the same side or on opposing sides of the carrier foil.

Further, the security element can exhibit at least one further, machine-readable security feature, especially a security feature having magnetic, electrically conductive, phosphorescent, fluorescent or other luminescent substances. If the security element exhibits a carrier foil, the thin-film element and the further security feature can be arranged on the same side or on opposing sides of the carrier foil. It is understood that the further security features can be combined with color-shifting layers and/or with gaps in the thin-film element. Of course it is, in principle, also conceivable that the thin-film element according to the present invention is arranged on a carrier foil that exhibits, as a further security feature, a diffraction pattern or matte pattern, the thin-film element being arranged next to the diffraction pattern or matte pattern, or over/under the diffraction pattern or matte pattern. In a further special embodiment, a security feature that is excitable in the ultraviolet spectral range is combined with the security element according to the present invention. For example, the UV-excitable layer can be arranged over the black thin-film element according to the present invention (so facing the absorber layer side), or on the side of the thin-film element facing the reflection layer side.

In expedient embodiments, the security element is present on a carrier foil, especially a PET foil having a layer thickness between 6 μm and 23 μm. After the transfer of the security element to a data carrier, the carrier foil can be removed from the remaining layer structure of the security element, or it can remain in the layer structure as a fixed component of the security element.

According to an advantageous development of the present invention, the security element exhibits a phase-delay layer composed of a nematic liquid crystal material that faces the reflection layer side of the thin-film element, such that the phase-delay layer forms, together with the reflection layer, a polarization feature that is verifiable with a polarization filter. Here, the phase-delay layer can especially be present in the form of patterns, characters or codes, such that the motif formed stands out when viewed through a suitable polarization filter. If the security element exhibits a carrier foil, the thin-film element and the phase-delay layer can be arranged on the same side or on opposing sides of the carrier foil. In the latter case, expediently, a carrier foil is used that exhibits no or only low polarizing properties itself.

According to a further embodiment, the security element exhibits a phase-delay layer composed of a suitable liquid crystal material, the phase-delay layer facing the absorber layer side of the thin-film element. For example, the phase-delay layer composed of nematic liquid crystal material can be arranged over a layer composed of cholesteric liquid crystal material, the layer composed of cholesteric liquid crystal material displaying, together with the thin-film element according to the present invention, a color-shift effect. In such an embodiment, the viewer can perceive, from the absorber layer side, the color-shift effect of the cholesteric liquid crystal material in combination with the thin-film element, as well as verify, with suitable auxiliary means, the polarization effect of the polarization feature composed of nematic liquid crystal material.

In a further preferred embodiment, the security element exhibits a three-layer thin-film element according to the present invention that exhibits, for viewing from the absorber layer side, a very low reflection at all viewing angles in the entire visible spectral range, and thus appears black for the viewer. In a second region, especially that immediately adjoins the first region, the security element exhibits, furthermore, a thin-film element that, for example by changing the thickness of the dielectric spacing layer, does not appear black to the viewer at all viewing angles and/or not in the entire visible spectral range.

If such a security element having first regions that appear black for the viewer, and second regions that do not appear black for the viewer at all viewing angles and/or not in the entire visible spectral range, is now provided, as described above, with a color-shifting layer composed of a suitable cholesteric liquid crystal material, with the color-shifting layer facing the absorber layer side of the thin-film element, then the black-appearing thin-film element forms, in the first regions, a dark background for the color-shifting layer, whereas in the second regions, due to the different-from-black background, a color results for the viewer that differs from the color of the first region. In other words, the security element according to the present invention exhibits a first region that displays a first color-shift effect for the viewer, and a second region that displays a second color-shift effect that is different from the first.

Of course, also this special security element having first and second color-shifting regions can, in principle, be developed in such a way as is described for the security element having only one color-shifting layer. In particular, the thin-film element having first and second regions and the color-shifting layer can be arranged on the same side or on opposing sides of a carrier foil. And also the combination with a further, especially machine-readable security feature, as well as the combination with a phase-delay layer composed of a nematic liquid crystal material, is conceivable. The above-described security element is characterized by an extraordinarily high counterfeit security.

It is understood that the security element according to the present invention can exhibit a region that exhibits, at all viewing angles and in the entire visible spectral range, substantially the same, different-from-black color. For example, a security element according to the present invention, as described above, having a color-shifting layer composed of a cholesteric liquid crystal material that faces the absorber layer side of the thin-film element, such that the black-appearing thin-film element forms a dark background for the color-shifting layer, can be arranged on a suitable carrier foil in such a way that the color-shifting thin-film structure immediately adjoins a region that is likewise arranged on the carrier foil and that exhibits substantially the same different-from-black color at all viewing angles and in the entire visible spectral range. Such security elements, in which a color-shifting thin-film structure according to the present invention is arranged immediately next to a region that exhibits substantially the same color at all viewing angles and in the entire visible spectral range, are very attractive for the viewer and are characterized by a particularly high counterfeit security.

Of course the security element having regions that display a color-shift effect and regions that display substantially a certain, unchanging color can also be combined with further security features, for example a phase-delay layer composed of a suitable liquid crystal material, as is described above.

The security element is advantageously a security thread, a security band, a security strip, a patch or a label for application to a security paper, value document or the like.

The present invention also comprises a method for manufacturing a security element of the kind described, in which a reflection layer, a dielectric spacing layer and an absorber layer are stacked to form a three-layer thin-film element, and in which the reflection layer, the absorber layer and the dielectric spacing layer are coordinated with each other in such a way that the thin-film element exhibits, for viewing from the absorber layer side at all viewing angles and in the entire visible spectral range, a very low reflection and appears black.

The present invention further comprises a data carrier, especially a value document, such as a banknote, an identification card or the like, having a security element of the kind described. To manufacture such a data carrier, a security element of the kind described is applied to a data carrier substrate, for example a printed-on or unprinted-on paper or plastic substrate, or completely or partially embedded in such a data carrier substrate. The security element can especially also be arranged over a window region or a through opening in the data carrier and, in this way, be visible from both sides.

Further exemplary embodiments and advantages of the present invention are described below with reference to the drawings. To improve clarity, a depiction to scale and proportion is dispensed with in the drawings.

Figure 2:
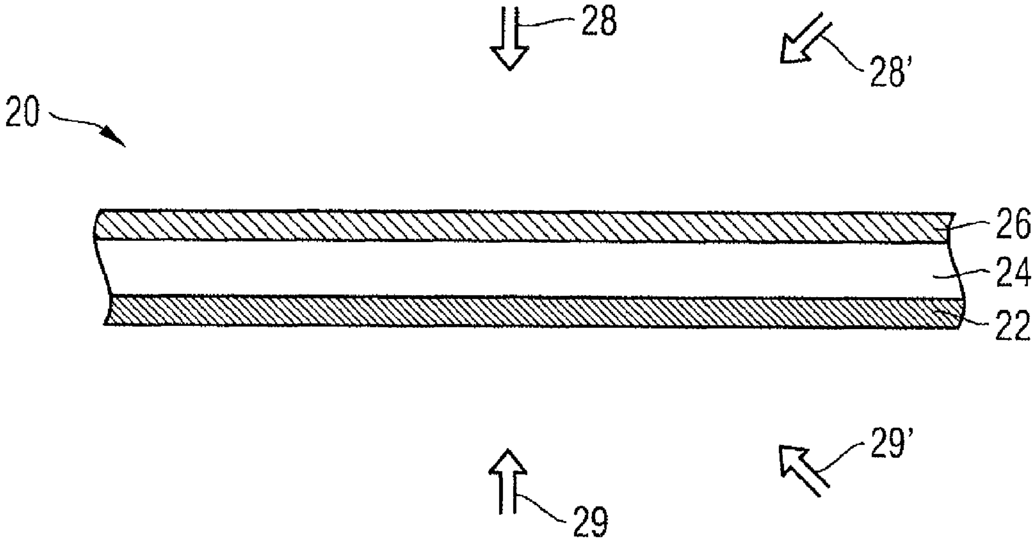
Figure 3:
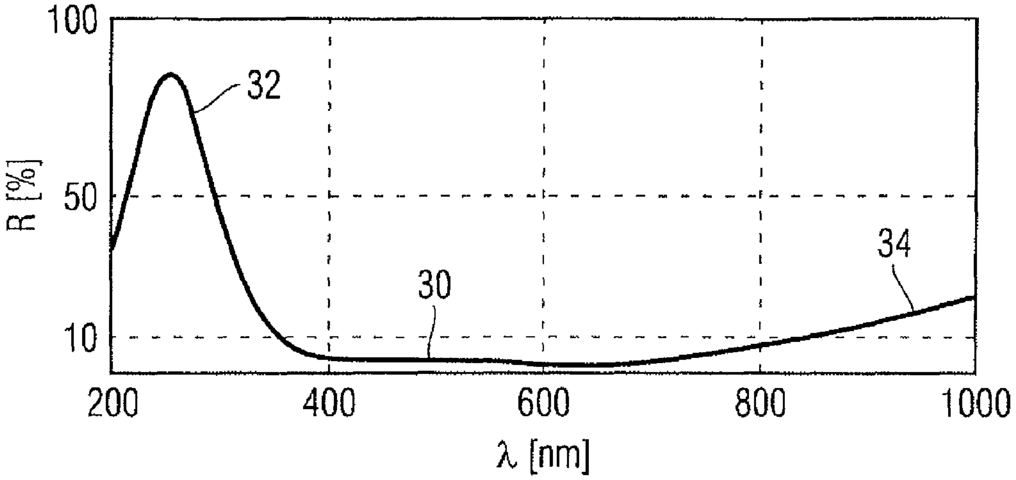
Figure 4:
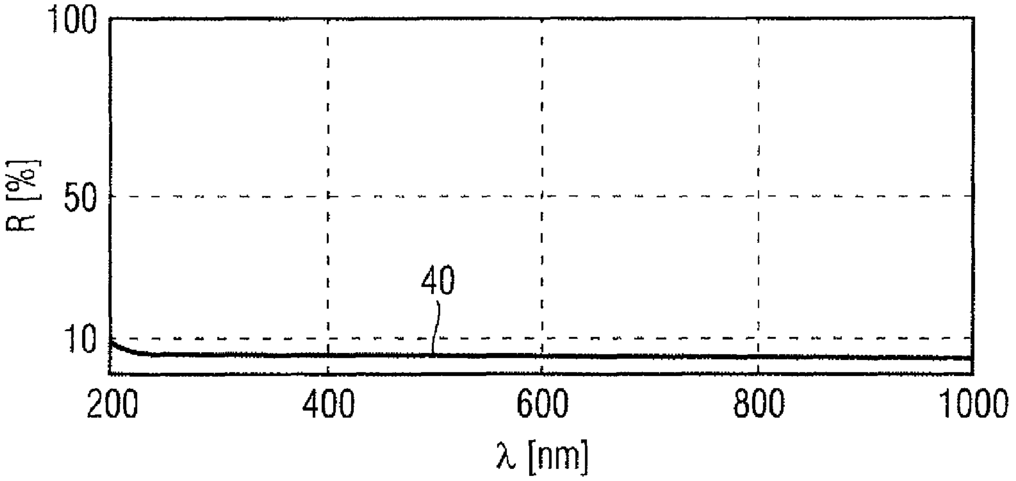
Figure 5:
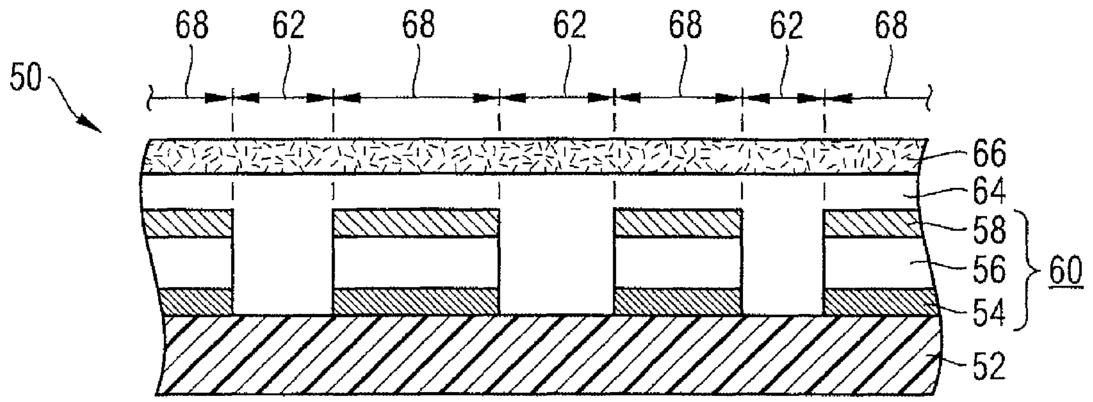
Figure 6:
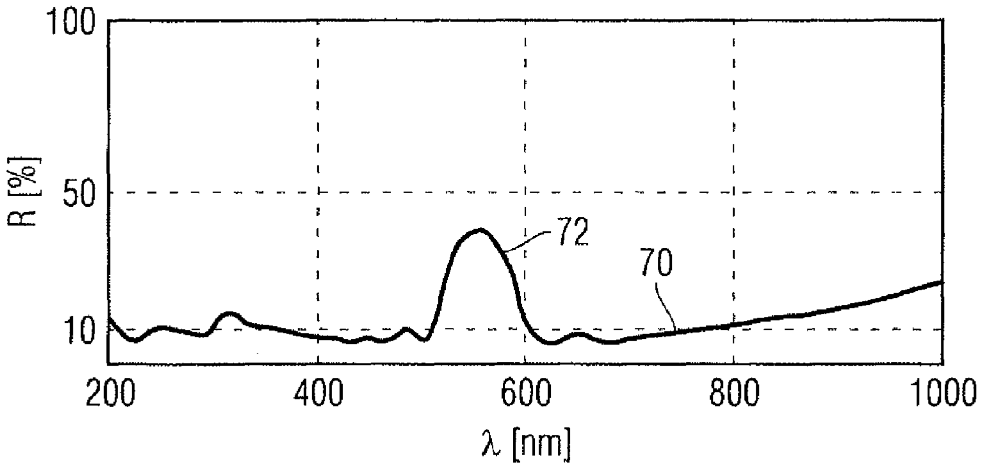
Figure 7:
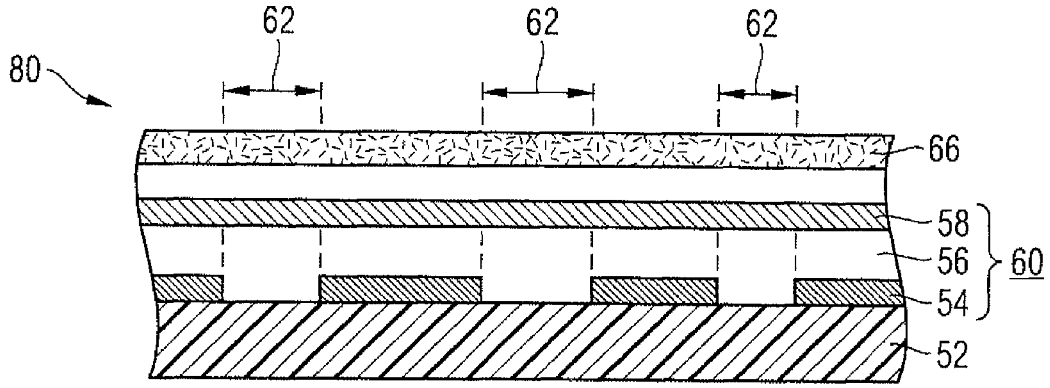

Shown are:

FIG. 1 a schematic diagram of a banknote having an embedded security thread, FIG. 2 schematically, the layer structure of a security element according to the present invention, in cross section, FIG. 3 Schematically, the reflection spectrum of the thin-film element depicted in FIG. 2 for vertical viewing direction from above, FIG. 4 schematically, the reflection spectrum of a thick, printed, black layer on a foil, FIG. 5 a security foil such as can be used for the manufacture of a security thread depicted in FIG. 1, FIG. 6 schematically, the reflection spectrum of the security foil in FIG. 5 in non-gap regions when viewed vertically from above, FIG. 7, 8 further exemplary embodiments of security foils according to the present invention.

Figure 9:
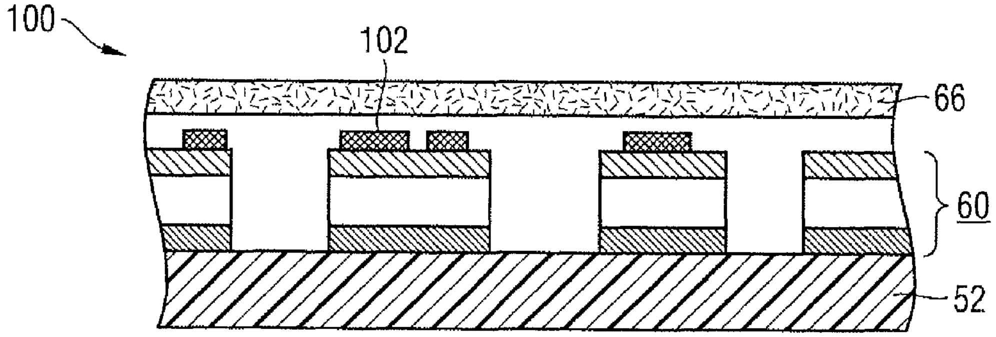
Figure 11:
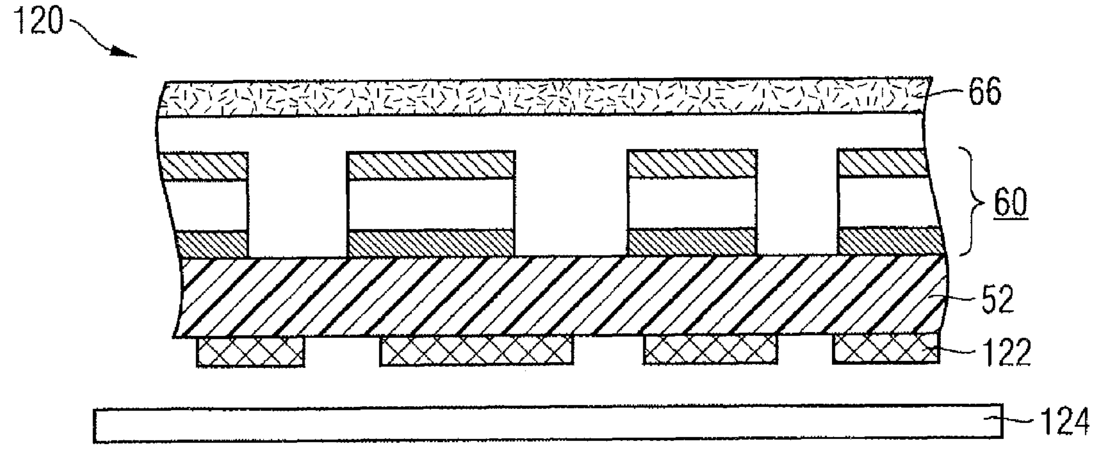
Figure 12:
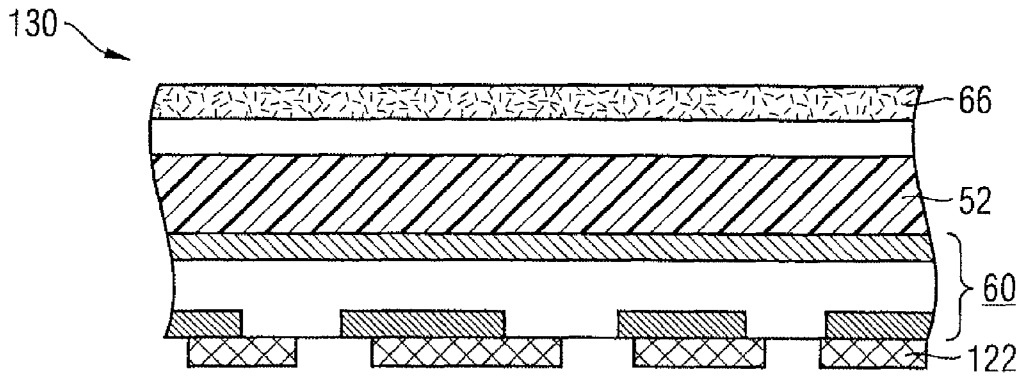
Figure 13:
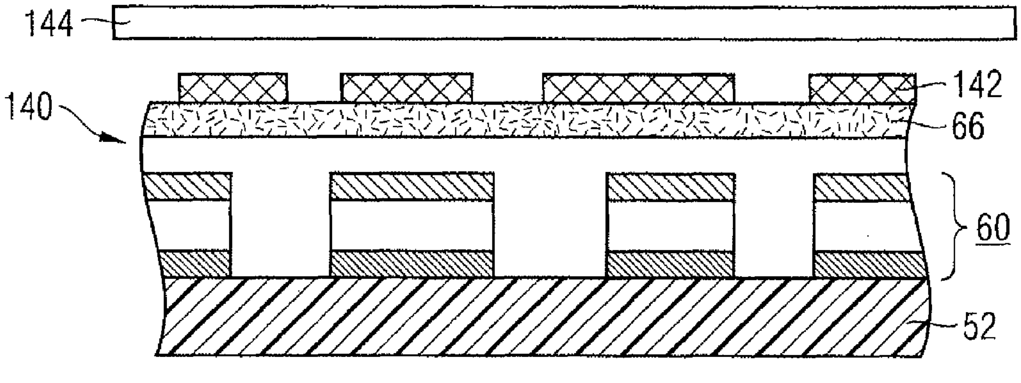

FIG. 9, 10 further security foils according to exemplary embodiments of the present invention, that include additional machine-readable security features, and FIGS. 11 to 13 security elements according to further exemplary embodiments of the present invention, in which the thin-film element is combined with a phase-delay layer composed of birefringent material.

The invention will now be explained using the example of security elements for banknotes. For this, FIG. 1 shows a schematic diagram of a banknote 10 that is provided with a security element 12 according to the present invention. The security element shown constitutes a security thread 12 that emerges at certain window regions 14 at the surface of the banknote 10, while it is embedded in the interior of the banknote 10 in the regions lying therebetween.

When viewed, the security thread 12 displays a color-shift effect with brilliantly luminous colors whose tone in the exemplary embodiment switches from green when viewed vertically to blue when viewed at an acute angle. Furthermore, the security thread 12 exhibits negative characters 16 that, in the exemplary embodiment, are formed in the shape of the alternating letter and number strings “PL” and “10”. In reflected light, the negative characters 16 are perceptible due to the lack of a colored impression or of the color-shift effect. The negative characters 16 stand out particularly strongly when the banknote 10 is viewed in transmitted light, where they luminesce brightly against the otherwise opaque background of the embedded security thread 12.

To achieve such a visual impression, the security thread 12 includes a particularly developed thin-film element that forms, with its top side, an all-around black background for a color-shifting liquid crystal layer, as explained in greater detail below.

With reference to FIG. 2, a security element according to the present invention includes, in the simplest case, a three-layer thin-film element 20 having a reflection layer 22, an absorber layer 26 and a dielectric spacing layer 24 arranged between the reflection layer 22 and the absorber layer 26.

In the exemplary embodiment, the reflection layer 22 is formed from a 30 nm thick aluminum layer. In principle, however, also other metals, such as silver, nickel, copper, iron, chrome, gold or further highly reflective metals may be used as reflector materials. The layer thickness of the reflection layer is typically between 10 nm and 200 nm, usually between about 30 nm and about 100 nm.

On the one hand, low-index dielectrics having a refractive index below 1.8 may be used for the dielectric spacing layer, such as $SiO_2$, MgF, $SiO_x$ with 1<x<2 or $Al_2O_3$. On the other hand, also high-index dielectrics having a refractive index of 1.8 or more can be used, such as $ZrO_2$, ZnS, $TiO_2$ or indium tin oxide (ITO). In low-index dielectrics, the layer thickness of the spacing layer 24 is preferably between about 50 nm and about 90 nm, in high-index dielectrics, preferably between about 20 nm and about 50 nm. In the exemplary embodiment in FIG. 2, the dielectric spacing layer 24 is formed by an 80 nm thick $SiO_2$ layer.

In the exemplary embodiment, the absorber layer 26 is formed by a 6 nm thick chrome layer. In principle, however, also other materials, such as iron, gold, aluminum or titanium, that are applied in a thickness between 2 nm and about 10 nm, may be used as absorber layers. Further details on the structure of thin-film elements and especially on the materials that are usable for the reflection layer, the dielectric spacing layer and the absorber layer, as well as the layer thicknesses that may be used for the reflection layer and the absorber layer, are set forth in publication WO 01/03945 A1, whose disclosure is incorporated in the present application by reference.

According to the present invention, the reflection layer 22, the absorber layer 26 and the dielectric spacing layer 24 are coordinated with each other in such a way that, for viewing 28 from the side of the absorber layer 26 at all viewing angles 28, 28' and in the entire visible spectral range between λ=400 nm and λ=800 nm, the thin-film element 20 exhibits a very low reflection and appears black for a viewer.

The perceptible color impression of a thin-film element having the described structure is based on viewing-angle-dependent interference effects due to multiple reflections in the different sub-layers of the element and especially depends on the optical thickness of the dielectric spacing layer. In conventional thin-film elements, the path difference of the beams reflected at different sub-layers is on the order of the wavelengths of visible light, such that, due to destructive interference and amplification of certain wavelengths, an angle-dependent color impression results in the visible spectral range.

In the thin-film elements 20 according to the present invention, the layer thickness of the dielectric spacing layer 24 is now chosen to be so small that all constructive interference maxima are in the ultraviolet spectral range and the thin-film elements exhibit no reflection maximum in the visible spectral range at all viewing angles. Here, through suitable coordination especially of the refractive index and layer thickness of the spacing layer 24, surprisingly, it can be achieved that the reflectivity of the thin-film element is very low and largely uniform in the entire visible spectral range, so from λ=400 nm to λ=800 nm, such that such a thin-film element appears black when viewed from the side of the absorber layer.

FIG. 3 shows, schematically, the reflection spectrum 30 of the thin-film element 20 depicted in FIG. 2 for vertical viewing 28. With increasing wavelength, the reflection decreases sharply after a reflection maximum 32 in the ultraviolet spectral range, which is about 250 nm in the exemplary embodiment, and is then well below 10% in the entire visible spectral range from 400 nm to 800 nm.

When the thin-film element 20 is viewed at an acute angle 28', due to the physical conditions, the reflection maximum 32 shifts to even shorter wavelengths, so remains in the non-visible, ultraviolet spectral range. As evident from the flat slope 34 of the reflection of the thin-film element between 800 nm and 1000 nm (FIG. 3), a blue shift of the reflection spectrum does not lead to a significant increase in the reflection in the visible spectral range there, either, particularly as the human eye is only slightly sensitive at the red end of the spectral range. The thin-film element 20 thus appears for the viewer having a deep black tone also upon oblique viewing 28'.

In FIG. 4, the reflection spectrum 40 of a thick, printed, black layer on a foil is shown as a reference. As evident from a comparison of the reflection curves 30, 40, in the visible spectral range from 400 nm to 800 nm, the thin-film element 20 according to the present invention produces a black impression that is very similar to that of a black printing layer.

As already mentioned, it is also possible, especially through a suitable choice of the thickness of the dielectric spacing layer of the thin-film element, to create a region of the security element according to the present invention that does not appear black for the viewer for all viewing angles and/or not in the entire visible spectral range.

When the thin-film element 20 is viewed 29 from the bottom, so from the side of the reflection layer 22, the thin-film element 20 appears to be highly metallically glossy at all viewing angles 29, 29' and in the entire visible spectral range. The thin-film structure of the element 20 can thus easily be distinguished from a conventional black printing layer, also without auxiliary means. In addition, the position of the reflection maximum 32 in the ultraviolet spectral range and its shift upon tilting the thin-film element 20 can be used as a characteristic authenticating mark and can be detected with the aid of suitable spectroscopic instruments.

The metallic reflection from the reflection layer side can be used for security elements that are at least partially visible from the bottom, for example for security elements that are arranged over a see-through or window region of a banknote or value document. In interplay with a phase-shifting layer, the metallic reflection can also be used to produce a polarization feature, as explained in greater detail below. Furthermore, the opacity of the metallic reflection layer 22 can be used in coaction with demetalized regions to produce negative patterns, as already illustrated with reference to negative characters “PL” and “10” of the security thread 12 in FIG. 1.

In some embodiments, it can be advantageous to provide the dielectric material of the spacing layer with an absorbent material. For example, $SiO_2$ can be provided with absorbent metal ions or, in a particularly simple variant, cullet can be evaporated to apply the spacing layer 24. Instead of as a vapor-deposited layer, the dielectric spacing layer 24 can also be executed as a printing layer, with, in this case, an absorbent material, such as carbon black, easily being able to be added.

The exemplary embodiment in FIG. 5 shows a security foil 50, such as can be used for the manufacture of a security thread 12 depicted in FIG. 1.

The security foil 50 includes a carrier foil 52 in the form of a transparent plastic foil on which are applied, in layer sequence from bottom to top, an aluminum reflection layer 54, a 70 nm thick spacing layer 56 composed of $SiO_2$ and a 4 nm thick absorber layer 58 composed of chrome, to form a three-layer thin-film element 60 that appears black from all viewing directions when viewed from the absorber layer side 58.

Further, there are introduced into the thin-film element 60 gaps 62 in the form of patterns, characters or codes that form transparent or translucent regions in the thin-film element 60. To produce the gaps 62, in the exemplary embodiment, the carrier foil 52 was printed on in the region of the desired gaps with an activatable printing ink, and then the layers 54, 56, 58 of the thin-film element 60 contiguously vapor deposited on the printed-on carrier foil. Thereafter, the printing ink was activated and the three layers 54, 56, 58 lying thereabove removed in some regions.

As activatable printing inks are suitable, for example, printing inks having foamable additives that split off gas under the action of heat, reduce the adhesion to the carrier foil due to the resulting volume increase and, in this way, subsequently offer mechanically acting treatment methods a good point of application for carving out the negative pattern. Further details on such a washing process can be found in publication EP 0 516 790 B1, whose disclosure is incorporated in the present application by reference. It is understood that, to produce negative patterns, also other methods known to the person of skill in the art for producing gaps can be used, such as the washing process described in publication WO 99/13157, based on the imprinting of a soluble printing ink having a porous structure, or also etching methods of all kinds.

To the patterned thin-film element 60 is further applied, contiguously, over an adhesive or primer layer 64, a color-shifting, cholesteric liquid crystal layer 66. In the non-gap regions 68, the black-appearing thin-film element 60 forms a dark background for the liquid crystal layer 66 and permits its color-shift effect to appear in brilliant colors. FIG. 6 shows, schematically, the reflection spectrum 70 of the security foil 50 depicted in FIG. 5 in the non-gap regions 68 when viewed vertically from above, so when viewed from the side of the color-shifting liquid crystal layer 66. The reflection spectrum 70 shows a clearly pronounced reflection maximum 72 in the green spectral range at a wavelength of about 550 nm. The security foil 50 thus appears, when viewed vertically, in a brilliant, luminous green. For acute viewing angles, the reflection maximum 72 shifts, due to the physical conditions, to shorter wavelengths, so those present in the blue spectral range. Thus, when viewed at an acute angle, the security foil 50 appears deep blue such that, when the foil 50 is tilted, a pronounced color-shift effect from green to blue is observed.

In the region of the gaps 62, the liquid crystal layer 66 is typically present against a light background, such as a paper background for partially embedded or affixed security elements. Against such a light background, the color-shift effect of the liquid crystals is not visible, or is only weakly visible, such that the gaps 62 appear, in top view, as color-free regions without a color-shift effect. The gap regions 62 are particularly conspicuous when viewed in transmitted light, where they stand out light against the background of the otherwise opaque thin-film element 60.

A further exemplary embodiment of a security foil 80 according to the present invention is depicted in FIG. 7. The structure of the security foil 80 corresponds largely to the structure of the security foil 50 in FIG. 5, with the difference, however, that only the reflection layer 54 of the thin-film element 60 is provided with gaps, while the separation layer 56 and the absorber layer 58 are developed to be contiguous. The visual appearance of the security foil 80 is similar to the appearance of the security foil 50, with, however, in the gap regions 62, the absorber layer 58 that is still present there darkening the negative pattern region somewhat.

Figure 8:
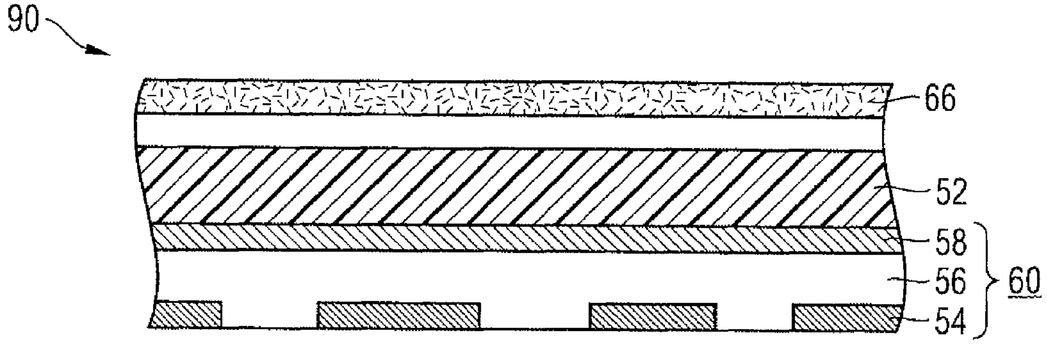

According to the further exemplary embodiment 90 shown in FIG. 8, the thin-film element 60 and the liquid crystal layer 66 can also be arranged on different sides of the carrier foil 52. What is essential for the effect according to the present invention is merely that the liquid crystal layer 66 faces the absorber layer side 58 of the thin-film element 60. The gaps in the thin-film element 60 can again extend through the entire element or, as depicted in the exemplary embodiment in FIG. 8, be developed only in the reflection layer 54.

Figure 10:
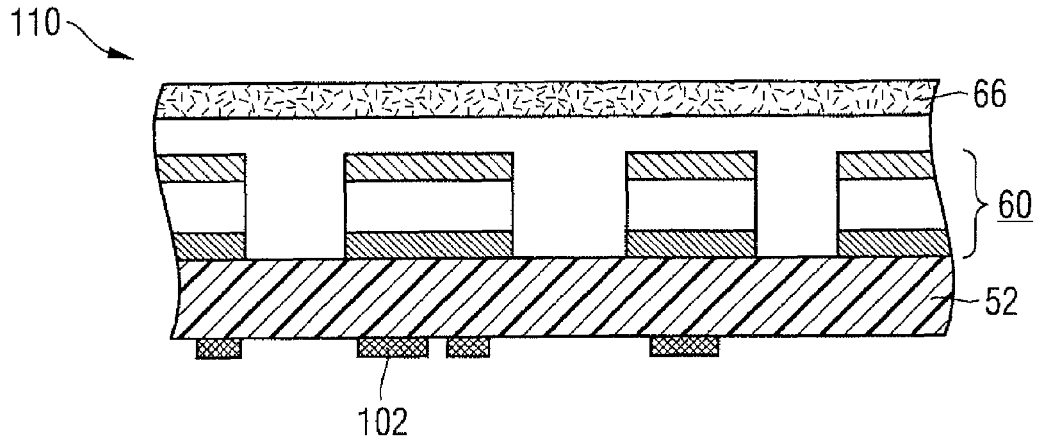

The layer structure of the security element according to the present invention can also receive further, especially machine-readable security features, as illustrated in the exemplary embodiments 100 and 110 in FIGS. 9 and 10 using the example of a magnetic security feature. Here, the magnet regions 102 can be imprinted, directly or also over a primer, as printed regions on the black absorber layer side of the thin-film element 60. The magnet regions 102 are normally black and thus attract no or only little attention against the black background of the thin-film element 60.

The magnet regions 102 can also be printed on the opposing side of the carrier foil 52. This variant shown in FIG. 10 has the advantage that the magnet regions then, in principle, cannot attract attention from the viewing side (the absorber layer side of the thin-film element). For this, the black magnet regions must, in some applications, be effectively optically covered in order to not attract attention vis-à-vis the highly reflective surroundings. Such a covering can occur, for example, through a coating having metal effect pigments and/or lithopone printing layers.

As shown in FIGS. 11 and 12, in further exemplary embodiments of the present invention, the thin-film element, black from one side and metallically glossy from the other side, can also be combined with a phase-delay layer composed of birefringent material.

With reference to the security element 120 in FIG. 11 are applied, on the top side of a carrier foil 52, a thin-film element 60, and over an adhesive layer, a color-shifting liquid crystal layer 66, as already described in principle in connection with FIG. 5. In addition is provided on the bottom of the carrier foil 52 a phase-delay layer 122, applied in the form of a motif, that consists of a birefringent material, for example of nematic liquid crystal material. Here, the phase delay of the phase-delay layer 122 for visible light is typically between about $\lambda/4$ and about $\lambda/2$ and is $\lambda/4$ in the described exemplary embodiment.

When the security element 120 is viewed from below with common unpolarized light and without auxiliary means, the sub-regions with and without the phase-delay layer 122 are practically not distinguishable from one another, since the phase delay acts equally on all polarization directions of the incident light, and the light absorption of the phase-delay layer 122 is negligibly low.

If, in contrast, the security element 120 is viewed through a circular polarizer 124, then, through the coaction of the phase-delay layer 122 and the metallically reflective reflection layer 54, strong contrast differences are created between the sub-regions with and without the phase-delay layer 122, such that the motif formed by the phase-delay layer 122 appears clearly.

Here, the contrast differences that occur are based, in short, on the different influencing of the polarization of the incident light and of the light reflected by the reflection layer 54 in the regions with and without the phase-delay layer 122, which leads to the reflected light being able to pass the circular polarizer 124 in one case and being blocked in the other case. For a more detailed description of the functional principle and for advantageous embodiments of the phase-delay layer, reference is made to German patent application DE 10 2006 021 429 A1, whose disclosure is incorporated in the present application by reference.

Since the incident light in the design in FIG. 11 must pass through the carrier foil 52 before and after the reflection at the reflection layer 54, a carrier foil 52 is advantageously used that itself exhibits no or only low polarizing properties.

Alternatively, the phase-delay layer 122 can also be arranged directly on the reflection layer 54, as shown in the security element 130 in FIG. 12. In this case, the polarizing properties of the carrier foil play no role for the polarization feature.

In the exemplary embodiments in FIGS. 11 and 12, the polarization feature of the phase-delay layer 122 is combined with a color-shifting layer 66 and with gaps 62 in the thin-film element 60. The polarization feature can, of course, also be provided in security elements without gaps and/or in security elements without color-shifting layers. In the latter case, the polarization feature is present on the metallically reflective side of a thin-film element, while the opposing side appears glossy black for the viewer. Taken on its own, the glossy black surface can, for example, be used as a design element, or form a black background for a further security or design element.

For example, a banknote can be provided in a first region with the glossy black thin-film element and include, in a see-through window of another region, a liquid crystal layer. If the liquid crystal layer is laid on the black surface of the thin-film element by folding the banknote, then the color-shift effect of the liquid crystal layer that was previously not visible or hardly visible stands out clearly.

Furthermore, with reference to FIG. 13, it is also possible to arrange a phase-delay layer on the side facing the absorber layer side of the thin-film element, for example over a layer composed of cholesteric liquid crystal material 66 that is arranged over a thin-film element 60. While in the security element 140 shown in FIG. 13, the layer sequence composed of the carrier foil 52, thin-film element 60 and cholesteric liquid crystal material 66 corresponds to the structure of the security element 120 shown in FIG. 11, the phase-delay layer 142 of the security element 140 is arranged on the color-shifting liquid crystal layer 66. The phase-delay layer 142 can consist, for example, of nematic liquid crystal material and exhibit a thickness that is suitable for achieving the phase delay and that leads to a phase delay between about $\lambda/4$ or about $\lambda/2$. With a circular polarizer 144, the polarization effect can, as described in FIG. 11, be verified by the viewer. Here, the cholesteric liquid crystal material 66 acts, together with the thin-film element 60, as a reflector for the phase-delay layer composed of nematic liquid crystal material 142. In the security element 140, the viewer can, from the side facing the absorber layer side, thus both perceive the color-shift effect of the layer composed of cholesteric liquid crystal material 66 over the thin-film elements 60 and verify the polarization effect of the nematic liquid crystal material 142 with a suitable polarization filter 144.

Here, the polarization effect of the security element 140 is not, as may be the case in the security element 120 in FIG. 12, impaired by polarizing properties of the foil 52.

It is understood that all embodiments described with reference to FIG. 1 to FIG. 13 can, in principle, exhibit a region in which, due to the chosen thickness especially of the dielectric spacing layer, the thin-film element does not appear black for the viewer in the entire visible spectral range and/or not for all viewing angles, and color-shift effects thus result that differ from the color-shift effects described with reference to FIG. 1 to FIG. 13. It is, of course, also conceivable to combine a security element according to the present invention with regions that exhibit substantially the same color for the viewer in the visible spectral range and at all viewing angles.

It is further noted that the carrier foil of the security element according to the present invention can optionally also exhibit, regionally or contiguously, especially an embossed diffraction pattern and/or matte pattern that is arranged next to or over/under the thin-film element and produces interesting synergistic effects, especially reflected light/transmitted light effects that further increase the counterfeit protection of the security element.

The invention claimed is:

1. A security element for securing data carriers, having a three-layer thin-film element composed of a reflection layer, an absorber layer and a dielectric spacing layer arranged between the reflection layer and the absorber layer, in which at least the thickness of each of the reflection layer, the absorber layer and the dielectric spacing layer are coordinated with each other in such a way that the thin-film element exhibits, for viewing from the absorber layer side at all viewing angles and in the entire visible spectral range, a very low reflection below 20% and appears black.

2. The security element according to claim 1, characterized in that, for viewing from the absorber layer side at all viewing angles and in the entire visible spectral range, the reflection of the thin-film element is below 15%, particularly preferably below 10%.

3. The security element according to claim 1, characterized in that the thin-film element exhibits, for viewing from the absorber layer side in the entire visible spectral range and at all viewing angles, no reflection maximum.

4. The security element according to claim 1, characterized in that the thin-film element exhibits, for viewing from the absorber layer side, a reflection maximum in the ultraviolet spectral range.

5. The security element according to claim 1, characterized in that the layer thickness of the dielectric spacing layer is between 20 nm and 90 nm.

6. The security element according to claim 5, characterized in that the spacing layer is formed substantially from a low-index dielectric having a refractive index $n<1.8$, especially composed of $SiO_2$ or $MgF_2$, and exhibits a layer thickness between 50 nm and 90 nm, especially of about 70 nm.

7. The security element according to claim 5, characterized in that the spacing layer is formed substantially from a high-index dielectric having a refractive index $n\geqq1.8$, especially composed of $TiO_2$ or ZnS, and exhibits a layer thickness between 20 nm and 50 nm, especially of about 40 nm.

8. The security element according to claim 1, characterized in that the dielectric material of the spacing layer is supplemented with an absorbent substance, especially with absorbent metal ions.

9. The security element according to claim 1, characterized in that the thin-film element appears highly metallically glossy when viewed from the reflection layer side at all viewing angles and in the entire visible spectral range.

10. The security element according to claim 1, characterized in that the thin-film element exhibits gaps in the form of patterns, characters or codes that form transparent or translucent regions in the thin-film element.

11. The security element according to claim 10, characterized in that the gaps are present only in the reflection layer of the thin-film element.

12. The security element according to claim 1, characterized in that the security element exhibits a color-shifting layer composed of a cholesteric liquid crystal material that faces the absorber layer side of the thin-film element, such that the black-appearing thin-film element forms a dark background for the color-shifting layer.

13. The security element according to claim 1, characterized in that the security element exhibits at least one further, machine-readable security feature, especially having magnetic, electrically conductive, phosphorescent, fluorescent or other luminescent substances.

14. The security element according to claim 1, characterized in that the security element is present on a carrier foil, especially a PET foil, having a layer thickness between 6 μm and 23 μm.

15. The security element according to claim 1, characterized in that the security element exhibits a phase-delay layer composed of a nematic liquid crystal material that faces the reflection layer side of the thin-film element, such that the phase-delay layer forms, together with the reflection layer, a polarization feature that is verifiable with a polarization filter.

16. The security element according to claim 15, characterized in that the phase-delay layer is present in the form of patterns, characters or codes.

17. A method for manufacturing the security element according to claim 1, in which a reflection layer, a dielectric spacing layer and an absorber layer are stacked to form a three-layer thin-film element, and in which at least the thickness of each of the reflection layer, the absorber layer and the dielectric spacing layer are coordinated with each other in such a way that the thin-film element exhibits, for viewing from the absorber layer side at all viewing angles and in the entire visible spectral range, a very low reflection below 20% and appears black.

18. The method according to claim 17, characterized in that, as a dielectric spacing layer, substantially a low-index dielectric having a refractive index n <1.8, especially $SiO_2$ or $MgF_2$, is applied in a layer thickness between 50 nm and 90 nm.

19. The method according to claim 17, characterized in that, as a dielectric spacing layer, substantially a high-index dielectric having a refractive index n ≧1.8, especially $TiO_2$ or ZnS, is applied in a layer thickness between 20 nm and 50 nm.

20. The method according to claim 17, characterized in that the dielectric spacing layer is vapor deposited or imprinted.

21. The method according to claim 17, characterized in that the thin-film element is provided with gaps in the form of patterns, characters or codes.

22. The method according to claim 17, characterized in that the security element is provided, on the side facing the absorber layer side of the thin-film element, with a color-shifting layer composed of a cholesteric liquid crystal material, such that the black-appearing thin-film element forms a dark background for the color-shifting layer.

23. A data carrier, especially a value document, such as at least one of a banknote and an identification card, having the security element according to claim 1.

24. A method for manufacturing the data carrier of claim 23, in which the security element is applied to a data carrier substrate or completely or partially embedded in the data carrier substrate.

* * * * *